(12) United States Patent
Luo et al.

(10) Patent No.: US 8,873,961 B2
(45) Date of Patent: Oct. 28, 2014

(54) ECHELLE GRATING WITH CYCLIC FREE-SPECTRAL RANGE

(75) Inventors: Ying Luo, San Diego, CA (US); Xuezhe Zheng, San Diego, CA (US); Guoliang Li, San Diego, CA (US); Kannan Raj, San Diego, CA (US); Ashok V. Krishnamoorthy, San Diego, CA (US)

(73) Assignee: Oracle International Corporation, Redwood Shores, CA (US)

( * ) Notice: Subject to any disclaimer, the term of this patent is extended or adjusted under 35 U.S.C. 154(b) by 488 days.

(21) Appl. No.: 13/205,879

(22) Filed: Aug. 9, 2011

(65) Prior Publication Data

US 2013/0039661 A1 Feb. 14, 2013

(51) Int. Cl.
*H04J 14/02* (2006.01)
*G02B 6/293* (2006.01)

(52) U.S. Cl.
CPC ............... *H04J 14/02* (2013.01); *G02B 6/2931* (2013.01); *G02B 6/29308* (2013.01)
USPC ............. 398/79; 398/82; 398/84; 398/85; 398/87; 398/48; 398/49; 385/24; 385/37; 385/16; 385/17; 385/18; 359/566; 359/570; 359/571; 359/558

(58) Field of Classification Search
USPC ........... 398/79, 82, 83, 84, 85, 87, 45, 48, 49; 385/24, 37, 27, 39, 14, 16, 17, 18, 15; 359/566, 570, 571, 558
See application file for complete search history.

(56) References Cited

U.S. PATENT DOCUMENTS

| | | | |
|---|---|---|---|
| 5,937,113 A * | 8/1999 | He et al. | 385/11 |
| 6,169,838 B1 * | 1/2001 | He et al. | 385/129 |
| 6,657,723 B2 * | 12/2003 | Cohen et al. | 356/328 |
| 2002/0131685 A1 * | 9/2002 | He et al. | 385/24 |

OTHER PUBLICATIONS

Luff, B. J. et al., "Silicon Photonic Filters for High Speed Data Transmission Applications", ECOC 2010, Sep. 19-23, 2010.
Millett, Ronald et al., "Synthesis of Planar Reflective Gratings for Silicon Interconnects", Hindawi Publishing Corporation Advances in Optical Technologies, vol. 2008, Article ID 315724, 8 pages, Mar. 13, 2008.
Bogaerts, Wim et al., "Silicon-on-Insulator Spectral Filters Fabricated With CMOS Technology", IEEE Journal of Selected Topics in Quantum Electronics, vol. 16, No. 1, Jan./Feb. 2010, pp. 33-44.
Brouckaert, J. et al., "Planar Concave Granting Demultiplexer With High Reflective Bragg Reflector Facets", IEEE Photonics Technology Letters, pp. 309-311, vol. 20, No. 4, Feb. 15, 2008.
Feng, Dazeng et al., "Fabrication Insensitive Echelle Grating in Silicon-on-Insulator Platform", IEEE Photonics Technology Letters, pp. 284-286, vol. 23, No. 5, Mar. 1, 2011.

* cited by examiner

*Primary Examiner* — Hanh Phan
(74) *Attorney, Agent, or Firm* — Park, Vaughan, Fleming & Dowler LLP; Steven E. Stupp (57) ABSTRACT

An optical de-multiplexer (de-MUX) that includes an optical device that images and diffracts an optical signal using a reflective geometry is described, where a free spectral range (FSR) of the optical device associated with a given diffraction order abuts FSRs associated with adjacent diffraction orders. Moreover, the channel spacings within diffraction orders and between adjacent diffraction orders are equal to the pre-defined channel spacing associated with the optical signal. As a consequence, the optical device has a comb-filter output spectrum, which reduces a tuning energy of the optical device by eliminating spectral gaps between diffraction orders of the optical device.

20 Claims, 6 Drawing Sheets

ECHELLE GRATING WITH CYCLIC FREE-SPECTRAL RANGE

GOVERNMENT LICENSE RIGHTS

This invention was made with Government support under Agreement No. HR0011-08-9-0001 awarded by DARPA. The Government has certain rights in the invention.

BACKGROUND

1. Field

The present disclosure generally relates to optical devices. More specifically, the present disclosure relates to an optical de-multiplexer (de-MUX) that includes an echelle grating having a cyclic free-spectral range (FSR).

2. Related Art

Integrated silicon photonics is a promising new technology that provides a number of advantages for chip-level communication, such as very high index contrast and compatibility with CMOS fabrication technology. Ongoing research into integrated silicon photonics is focusing on opportunities to provide low latency, high bandwidth, high density, and low power consumption. To date, several key active elements, including silicon lasers, modulators, and photodetectors, have been realized in silicon using low-cost CMOS compatible processes. However, a wavelength filter (such as an optical de-MUX), which can be used in wavelength division multiplexing (WDM), has not been developed yet.

In principle, a number of optical de-MUX designs can be integrated with CMOS circuits, including: Mach-Zehnder (MZ) lattice filters, ring resonators, arrayed waveguide gratings (AWG) and planar concave gratings (echelle gratings). Echelle gratings are particularly interesting because they are less sensitive to many fabrication errors, and they can be easily scaled up to large channel counts while still maintaining a very compact footprint.

However, echelle gratings are sensitive to non-vertical grating facets and facet roughness, which can result in optical crosstalk and on-chip insertion loss. One approach for solving these problems is to use a very small diffraction angle from an echelle grating. For example, by placing the receiving optical waveguides very close to the zero degree diffraction angle, light focused onto the output optical waveguides (which carry the higher-order diffraction modes) may have almost the same wavelength as the fundamental mode. Consequently, the optical crosstalk and the insertion loss can be insensitive to the vertical angle of the grating facet. A disadvantage of this approach is that, with a very small diffraction angle, for a given linear dispersion, the focal length for the Rowland circle on which the output optical waveguides are arranged (and hence the size of the device) increases dramatically. In particular, compared with echelle gratings with a typical diffraction angle, this arrangement of the output optical waveguides may increase the device size by a factor of 10, which increases the manufacturing cost and may limit applications in size-sensitive optical links.

Another approach to solving the problems of optical crosstalk and insertion loss is to reduce the silicon thickness in a silicon-on-insulator (SOI) technology that is used to implement an echelle grating in an optical de-MUX (for example, the silicon thickness may be reduced to submicron, which is sometimes referred to as 'nano-photonic SOI'. In a nano-photonic SOI platform, dedicated deep etching techniques may not be needed because an improved grating profile can be obtained with less corner rounding, more vertical facets and significantly smoother sidewalls. In addition, the dependence of the optical crosstalk on facet verticality can be relaxed. For example, in order to maintain a 20 dB crosstalk performance, the maximum vertical tilt angle of the echelle grating can exceed 3° for a nano-photonic SOI platform, while for a thick SOI platform (with a silicon thickness of 2-5 µm), the echelle grating tilt may need to be tightly controlled to below 0.5°. Furthermore, when the silicon thickness is reduced to 0.25 µm, the free-propagation region becomes single mode. Therefore, there is no deterioration of optical crosstalk and insertion loss from coupling to higher modes.

However, in contrast with a thick SOI platform, the control of the center wavelength for an optical de-MUX implemented using a nano-photonic SOI platform can be extremely challenging because these devices are very sensitive to silicon thickness variation. For example a 3% variation in the silicon thickness is predicted to result in a central wavelength shift of approximately 10 nm for 0.25 µm SOI. As a consequence, wavelength tuning may be needed to correct for manufacturing-induced phase errors to align the optical de-MUX spectrum with transmitter channels, but this large tuning range may limit applications in energy-sensitive optical interconnects.

Hence, what is needed is an optical de-MUX that does not suffer from the above-described problems.

SUMMARY

One embodiment of the present disclosure provides an optical de-multiplexer (de-MUX). This optical de-MUX includes an optical device that images and diffracts an optical signal using a reflective geometry, where a free spectral range (FSR) of the optical device associated with a given diffraction order abuts FSRs associated with adjacent diffraction orders. The optical signal is associated with a predefined channel spacing. Moreover, a first channel spacing within the given diffraction order and a second channel spacing between one of the adjacent diffraction orders and the given diffraction order are equal to the predefined channel spacing so that the optical device has a comb-filter output spectrum, thereby reducing a tuning energy of the optical device by eliminating spectral gaps between diffraction orders of the optical device.

Furthermore, an incidence angle associated with the given diffraction order may be different than a diffraction angle associated with the given diffraction order. Alternatively or additionally, the optical device may include a diffraction grating on a curved surface. Note that a grating pitch of the diffraction grating may be greater than 20 µm. In some embodiments, the optical device includes an echelle grating.

In some embodiments, the optical de-MUX includes control logic that assigns a given carrier wavelength in the optical signal to a nearest wavelength channel in one of the diffraction orders of the optical device, thereby compensating for a shift in the spectral locations of the channels and reducing the tuning energy.

Additionally, in some embodiments the optical de-MUX includes: a substrate; a buried-oxide layer disposed on the substrate; and a semiconductor layer disposed on the buried-oxide layer, where the optical device is included in the semiconductor layer. For example, the substrate may include a semiconductor. In particular, the substrate, the buried-oxide layer and the semiconductor layer may comprise a silicon-on-insulator technology.

In some embodiments, the optical de-MUX includes a polarization compensator proximate to the optical device, where the polarization compensator compensates for variation in a polarization of the optical signal.

Another embodiment provides an optical MUX.

Another embodiment provides a system that includes the optical de-MUX or the optical MUX.

Another embodiment provides a method for de-multiplexing the optical signal. During the method, the optical signal is received by the optical de-MUX, where the optical signal is associated with the predefined channel spacing. Then, the optical device in the optical de-MUX, which has the reflective geometry, images and diffracts the optical signal, wherein the FSR associated with the given diffraction order of the optical device abuts FSRs associated with adjacent diffraction orders. Moreover, the first channel spacing within the given diffraction order and the second channel spacing between one of the adjacent diffraction orders and the given diffraction order are equal to the predefined channel spacing so that the optical device has a comb-filter output spectrum, thereby reducing the tuning energy of the optical device by eliminating spectral gaps between diffraction orders of the optical device. Next, the optical de-MUX outputs the imaged and diffracted optical signal.

BRIEF DESCRIPTION OF THE FIGURES

Table 1 provides design parameters for an echelle grating in accordance with an embodiment of the present disclosure.

Note that like reference numerals refer to corresponding parts throughout the drawings. Moreover, multiple instances of the same part are designated by a common prefix separated from an instance number by a dash.

DETAILED DESCRIPTION

Embodiments of an optical de-multiplexer (de-MUX), a system that includes the optical de-MUX, and a method for de-multiplexing an optical signal are described. This optical de-MUX includes an optical device that images and diffracts the optical signal using a reflective geometry, where a free spectral range (FSR) of the optical device associated with a given diffraction order abuts FSRs associated with adjacent diffraction orders (which is sometimes referred to as a 'cyclic FSR'). Moreover, the channel spacings within diffraction orders and between adjacent diffraction orders are equal to the predefined channel spacing associated with the optical signal (e.g., the FSR equals the number of channels times the channel spacing). As a consequence, the optical device has a comb-filter output spectrum, which reduces a tuning energy of the optical device by eliminating spectral gaps between diffraction orders of the optical device.

By providing a cyclic FSR, the optical de-MUX can overcome the central wavelength shift associated with manufacturing variation. As a consequence, absolute wavelength tuning (which is typically around 10 nm) can be avoided. Instead, the whole spectrum can be shifted to predefined wavelengths using a maximum required tuning range that is significantly less than one channel spacing (for example, less than 1 nm). In conjunction with the comb-filter output, this can further reduce the tuning energy, which may increase the use of the optical de-MUX in applications such as energy-efficient computing systems, without increasing the cost or size, or adversely impacting the performance.

Figure 1:
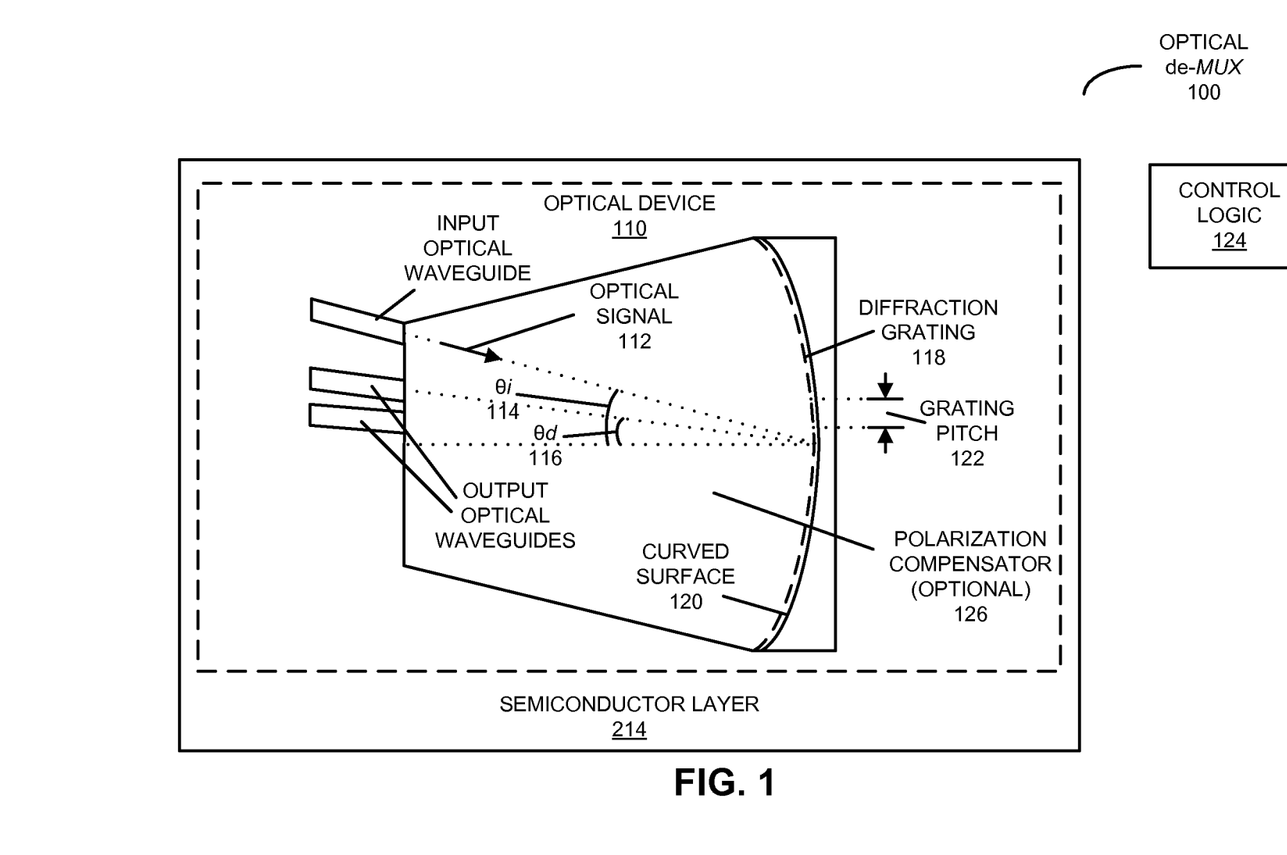
FIG. 1 is a block diagram illustrating a top view of an optical de-multiplexer (de-MUX) in accordance with an embodiment of the present disclosure.

We now describe embodiments of the optical de-MUX. FIG. 1 presents a block diagram illustrating a top view of optical de-MUX 100. This optical de-MUX includes an optical device 110 that images and diffracts an optical signal 112 using a reflective geometry. This optical signal is associated with a predefined channel spacing (such as those used in wavelength division multiplexing).

Figure 3:
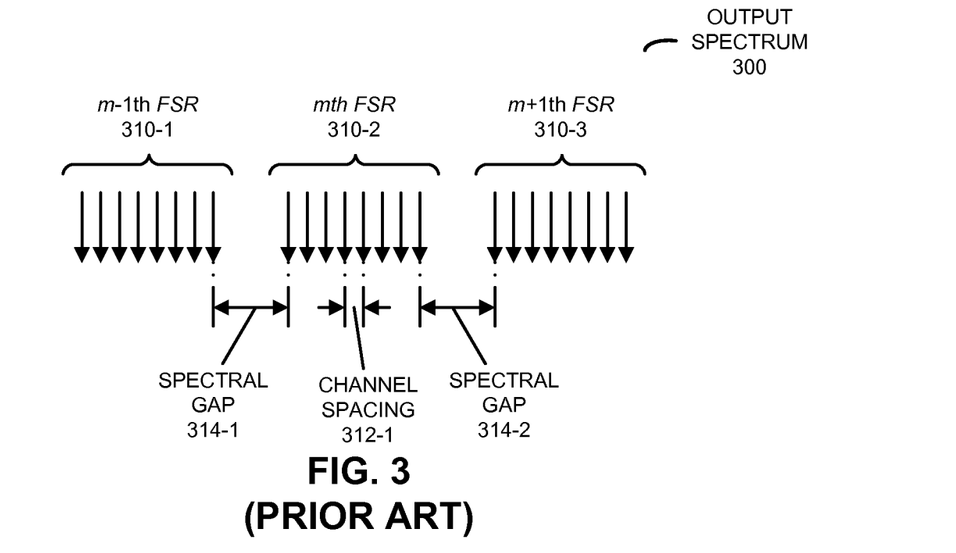
FIG. 3 is a drawing illustrating an output spectrum of an existing echelle grating.
Figure 4:
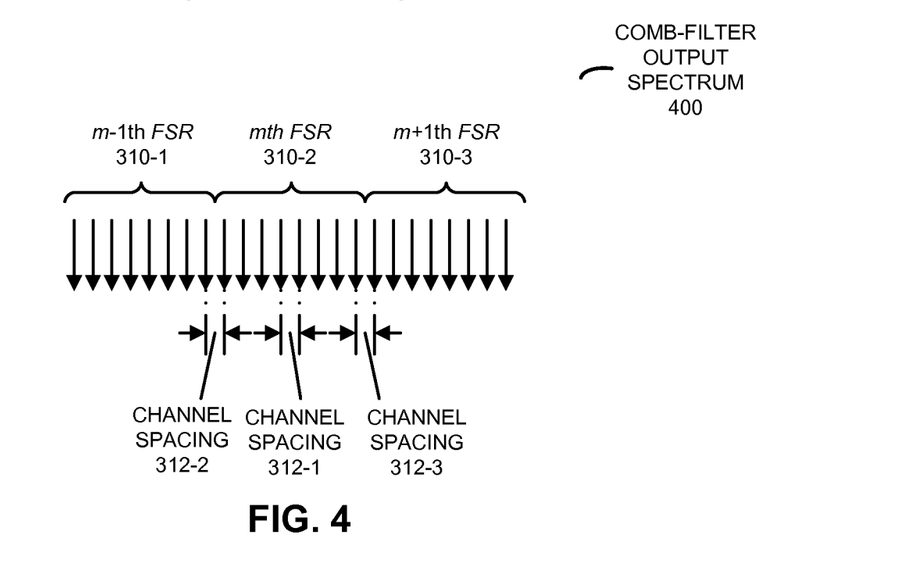
FIG. 4 is a drawing illustrating an output spectrum of an echelle grating in accordance with an embodiment of the present disclosure.

As illustrated in FIG. 4, an FSR 310-2 of optical device 110 associated with an mth diffraction order abuts FSRs 310-1 and 310-3 associated with adjacent diffraction orders. Moreover, a channel spacing 312-1 within the mth diffraction order and a channel spacing between one of the adjacent diffraction orders and the mth diffraction order (such as channel spacing 312-2) are equal to the predefined channel spacing of optical signal 112 (FIG. 1) so that optical device 110 (FIG. 1) has a comb-filter output spectrum 400, thereby reducing a tuning energy of optical device 110 (FIG. 1) by eliminating spectral gaps 314 (FIG. 3) between diffraction orders of optical device 110 (FIG. 1).

Referring back to FIG. 1, an incidence angle ($\theta_i$) 114 associated with a given diffraction order may be different than a diffraction angle ($\theta_d$) 116 associated with the given diffraction order. Alternatively or additionally, optical device 110 may include a diffraction grating 118 on a curved surface 120. Note that a grating pitch 122 of diffraction grating 118 may be greater than 20 μm. In some embodiments, optical device 110 includes an echelle grating.

In some embodiments, optical de-MUX 100 includes control logic 124 that assigns a given carrier wavelength in optical signal 112 to a nearest wavelength channel in one of the diffraction orders of optical device 110, thereby compensating for a shift in the spectral locations of the channels and reducing the tuning energy.

In some embodiments, optical de-MUX 100 includes an optional polarization compensator 126 proximate to optical device 110, where optional polarization compensator 126 compensates for variation in a polarization of optical signal 112.

Figure 2:
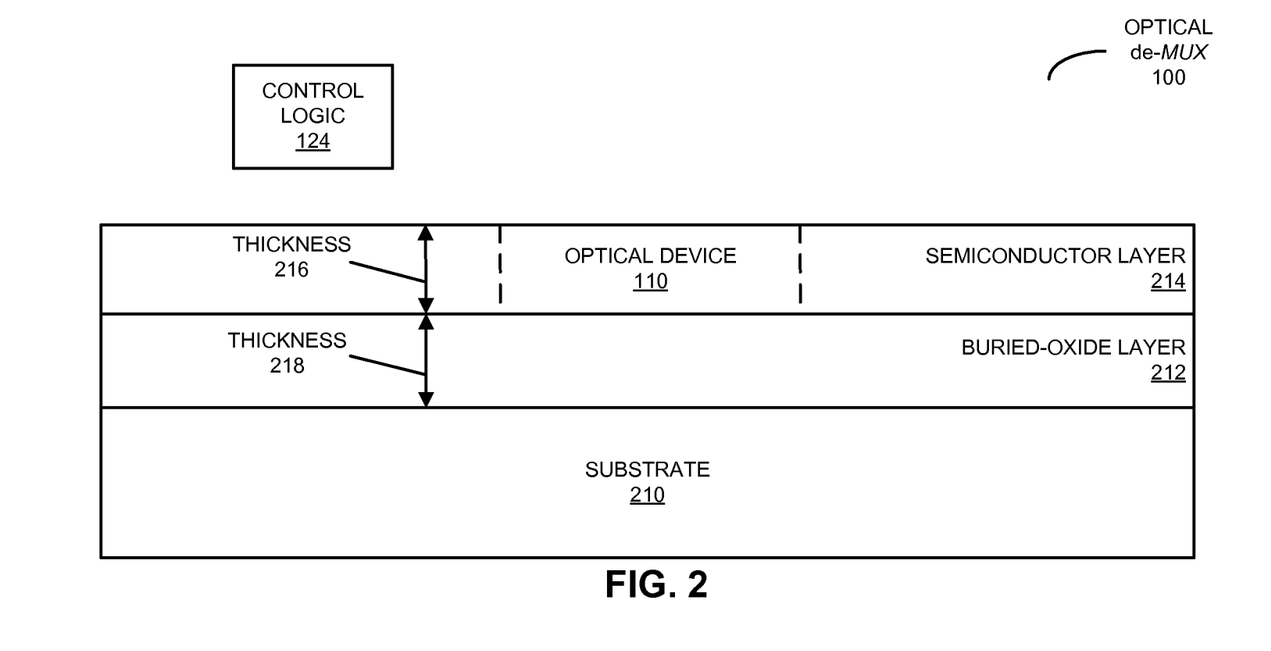
FIG. 2 is a block diagram illustrating a side view of the optical de-MUX in accordance with an embodiment of the present disclosure.

Optical de-MUX 100 may be implemented using silicon-on-insulator (SOI) technology. This is illustrated in FIG. 2, which presents a block diagram illustrating a side view of optical de-MUX 100. In particular, optical de-MUX may include: a substrate 210; a buried-oxide layer 212 disposed on substrate 210; and a semiconductor layer 214 disposed on buried-oxide layer 212, where optical device 110 is included in semiconductor layer 214. For example, substrate 210 and/or semiconductor layer 214 may include a semiconductor, such as silicon.

In an exemplary embodiment, optical signal 112 (FIG. 1) has wavelengths between 1.1-1.7 μm, such as an optical signal having a fundamental wavelength of 1.3 or 1.55 μm. Moreover, semiconductor layer 214 may have a thickness 216 that is less than 1 μm (such as 0.25-0.3 μm). Furthermore, buried-oxide layer 212 may have a thickness 218 between 0.3 and 3 μm (such as 0.8 μm).

As discussed previously, optical de-MUX 100 may have a narrow FSR which results in a cyclic FSR. In particular, the FSR may equal the product of the total channel count (N) and the channel spacing (Δλ). (More generally, the FSR may equal the product of an integer, the total channel count and the channel spacing.) Note that in diffraction echelle gratings, for a given output optical waveguide, not only the designed channel X but also channels with wavelengths of λ±m·FSR (where m is an integer) are assigned to the same output optical waveguide. In order to avoid channel overlap, in existing echelle gratings the FSR is typically chosen to be much larger than the wavelength range of the output channels. Thus, as shown in FIG. 3, which presents a drawing illustrating an output spectrum 300 of an existing echelle grating, there is a spectral gap 314 between each pair of FSRs 310. In contrast, as shown in FIG. 4, which presents a drawing illustrating a comb-filter output spectrum 400 of an echelle grating, when the FSR of the echelle grating is reduced to exactly N times Δλ, comb-filter output spectrum 400 is continuous with adjacent FSRs abutting each other.

While the center wavelength of an echelle-grating-based de-MUX can shift significantly because of manufacturing variation, the channel spacing typically can be very accurately controlled. Therefore, the output spectrum can be a periodic wavelength comb with output wavelengths equally spaced across the full spectrum range. Furthermore, in order to reduce the wavelength-tuning range, a group of wavelengths within an FSR that is closest to the designed wavelength targets can be chosen, regardless of where the absolute wavelengths are actually positioned in the output spectrum.

This is in contrast with an optical MUX, which usually requires that all the wavelength channels be registered in the same sequence as that of the laser or light sources. In particular, as long as each channel is aligned with the incoming wavelengths, the optical de-MUX can separate different wavelength channels. As a consequence, it is usually not necessary for the optical de-MUX channels to match the same wavelength order as in the optical MUX. Because of this design freedom offered by the optical de-MUX, the wavelength-registration process can be significantly simplified.

Figure 5:
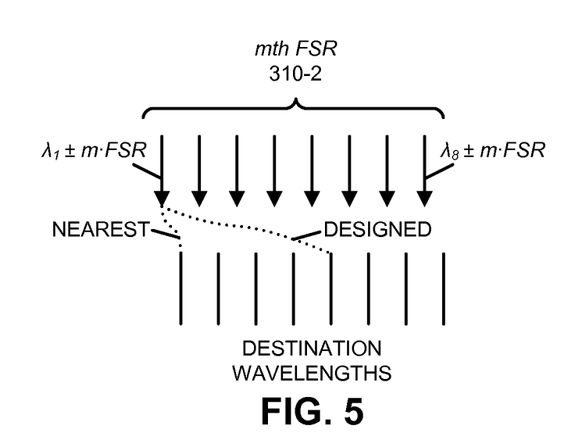
FIG. 5 is a block diagram illustrating wavelength registration in the optical de-MUX of FIGS. 1 and 2 in accordance with an embodiment of the present disclosure.

Furthermore, because of the periodic comb spectrum associated with the cyclic FSR, there are always two destination channels around a given output optical waveguide. Instead of tuning the absolute wavelengths to designed positions, this can be used to reduce the tuning energy because the output wavelengths only need to be tuned to their nearest output waveguide, i.e., to align to one of the two channels. As a consequence, the wavelength-tuning range needed for wavelength registration may be significantly reduced to less than a single channel spacing Δλ. This is illustrated in FIG. 5, which presents a block diagram illustrating wavelength registration in optical de-MUX 100 (FIGS. 1 and 2).

Note that, because the wavelength spacing between each of the output optical waveguides is insensitive to process variation, and can be controlled to be very close to the predefined channel spacing, it is possible to tune all the output channels simultaneously with a single tuning control, such as a metal resistor across the grating slab. This arrangement may also simplify the tuning circuits in the VLSI drivers.

We now discuss design of the cyclic FSR for an echelle-grating optical de-MUX. First, the order of diffraction can be determined using $$FSR = \lambda \cdot \eta_{eff}[(m+1) \cdot \eta_g - \eta_{eff}]^{-1}, \quad (1.1)$$

where λ is the carrier wavelength, $n_{eff}$ is the effective index of refraction in semiconductor layer 214 (FIG. 2) and $n_g$ is the group index of refraction in semiconductor layer 214 (FIG. 2). In general, a higher diffraction order m may be used to achieve a continuous comb spectrum with a narrower FSR. As a consequence, a larger grating period d may be needed in the echelle grating. This grating period can be expressed as $$d \cdot (\sin \theta_d + \sin \theta_i) = m \cdot \lambda \cdot \eta_{eff}^{-1}, \quad (1.2)$$

where $\theta_i$ is the incident angle and $\theta_d$ is the diffraction angle.

Note that echelle gratings offer high efficiency with high diffraction orders. Therefore, the use of a higher diffraction order may not impair the diffraction efficiency or add extra insertion loss to the optical de-MUX. Furthermore, larger grating facets are usually less sensitive to profile imperfection, which in turn can relax the fabrication tolerance. In conjunction with the absence of an impact on the Rowland circle radius (and hence the device size), all these parameters for a cyclic-FSR design may not lead to a degradation in the performance of the optical de-MUX. The parameters for an exemplary design of an echelle grating are provided in Table 1.

TABLE 1

| | |
|---|---|
| Channel count | 8 |
| Channel spacing (nm) | 1.6 |
| Optical crosstalk (dB) | 20-25 |
| Footprint (μm²) | 500 × 200 |
| Insertion loss | <3 dB |
| Carrier wavelength (nm) | 1550 |
| FSR (nm) | 12.8 |
| Thickness 216 (nm) | 300 |
| Diffraction order | 90 |
| Focal length (μm) | 350 |
| Grating pitch (μm) | 25 |

Figure 6:
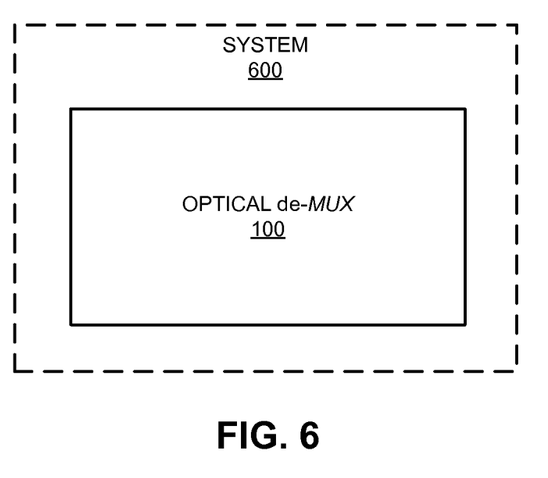
FIG. 6 is a block diagram illustrating a system that includes the optical de-MUX of FIGS. 1 and 2 in accordance with an embodiment of the present disclosure.

Optical de-MUX 100 (FIGS. 1 and 2) may be used in a variety of applications. This is shown in FIG. 6, which presents a block diagram illustrating a system 600 that includes optical de-MUX 100 (FIGS. 1 and 2). System 600 may include: a VLSI circuit, a switch, a hub, a bridge, a router, a communication system, a storage area network, a data center, a network (such as a local area network), and/or a computer system (such as a multiple-core processor computer system). Furthermore, the computer system may include, but is not limited to: a server (such as a multi-socket, multi-rack server), a laptop computer, a communication device or system, a personal computer, a work station, a mainframe computer, a blade, an enterprise computer, a data center, a portable-computing device, a tablet, a supercomputer, a network-attached-storage (NAS) system, a storage-area-network (SAN) system, and/or another electronic computing device. Note that a given computer system may be at one location or may be distributed over multiple, geographically dispersed locations.

Moreover, optical de-MUX 100 (FIGS. 1 and 2), as well as system 600, may include fewer components or additional components. Although these embodiments are illustrated as having a number of discrete items, these optical components, integrated circuits and the system are intended to be functional descriptions of the various features that may be present rather than structural schematics of the embodiments described herein. Consequently, in these embodiments two or more components may be combined into a single component, and/or a position of one or more components may be changed. In addition, functionality in the preceding embodiments of the integrated circuits and the system may be implemented more in hardware and less in software, or less in hardware and more in software, as is known in the art. For example, functionality may be implemented in one or more application-specific integrated circuits (ASICs) and/or one or more digital signal processors (DSPs).

While the preceding embodiments have been illustrated with an optical de-MUX, these approaches may also be used in an optical MUX.

Figure 7:
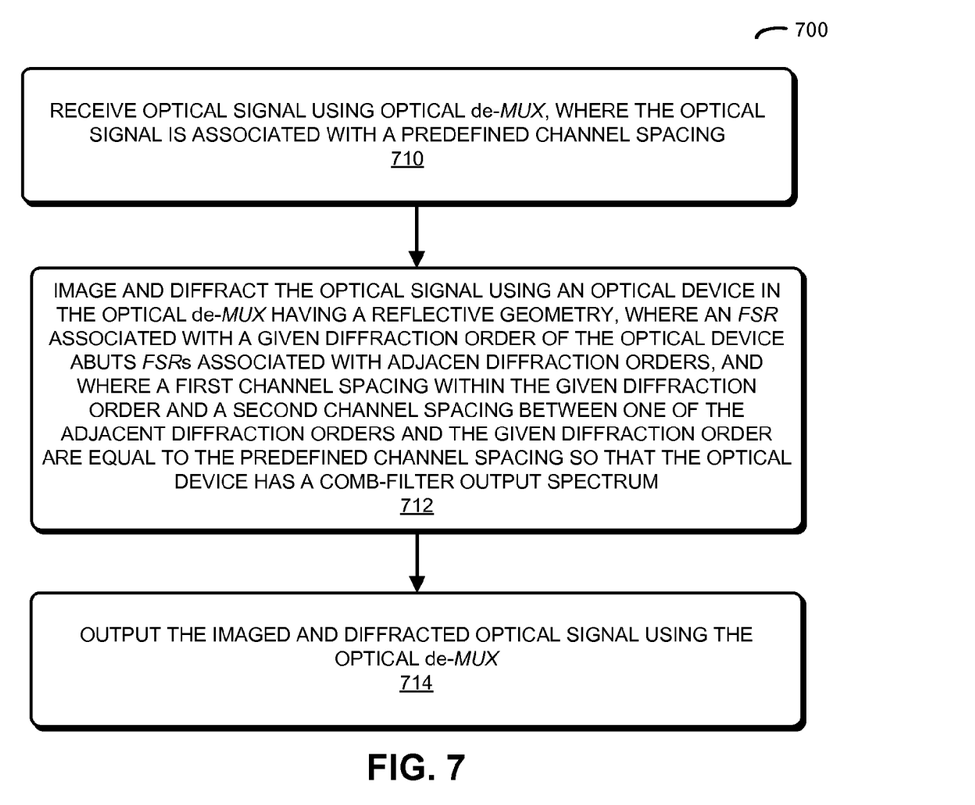
FIG. 7 is a flow chart illustrating a method for multiplexing or de-multiplexing an optical signal in accordance with an embodiment of the present disclosure.

We now describe embodiments of the method. FIG. 7 presents a flow chart illustrating a method 700 for de-multiplexing an optical signal, which may be performed by optical de-MUX 100 (FIGS. 1 and 2). During the method, the optical signal is received by the optical de-MUX, where the optical signal is associated with the predefined channel spacing (operation 710). Then, the optical device in the optical de-MUX, which has the reflective geometry, images and diffracts the optical signal, wherein an FSR associated with the given diffraction order of the optical device abuts FSRs associated with adjacent diffraction orders (operation 712). Moreover, the first channel spacing within the given diffraction order and the second channel spacing between one of the adjacent diffraction orders and the given diffraction order are equal to the predefined channel spacing so that the optical device has a comb-filter output spectrum, thereby reducing the tuning energy of the optical device by eliminating spectral gaps between diffraction orders of the optical device. Next, the optical de-MUX outputs the imaged and diffracted optical signal (operation 714).

In some embodiments of method 700 there are additional or fewer operations. Moreover, the order of the operations may be changed, and/or two or more operations may be combined into a single operation.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An optical de-multiplexer (de-MUX), comprising:
an optical device configured to image and diffract an optical signal using a reflective geometry, wherein a free-spectral range (FSR) associated with a given diffraction order of the optical device abuts a plurality of FSRs associated with adjacent diffraction orders;
wherein the optical signal is associated with a predefined channel spacing; and
wherein a first channel spacing within the given diffraction order and a second channel spacing between one of the adjacent diffraction orders and the given diffraction order are equal to the predefined channel spacing so that the optical device has a comb-filter output spectrum, thereby reducing a tuning energy of the optical device by eliminating spectral gaps between diffraction orders of the optical device.

2. The optical de-MUX of claim 1, wherein an incidence angle associated with the given diffraction order is different than a diffraction angle associated with the given diffraction order.

3. The optical de-MUX of claim 1, wherein the optical device includes a diffraction grating on a curved surface.

4. The optical de-MUX of claim 3, wherein a grating pitch of the diffraction grating is greater than 20 μm.

5. The optical de-MUX of claim 1, wherein the optical device includes an echelle grating.

6. The optical de-MUX of claim 1, further comprising control logic configured to assign a given carrier wavelength in the optical signal to a nearest wavelength channel in one of the diffraction orders of the optical device, thereby compensating for a shift in the spectral locations of the channels and reducing the tuning energy.

7. The optical de-MUX of claim 1, further comprising:
a substrate;
a buried-oxide layer disposed on the substrate; and
a semiconductor layer having a thickness less than 1 μm disposed on the buried-oxide layer, wherein the optical device is included in the semiconductor layer.

8. The optical de-MUX of claim 7, wherein the substrate includes a semiconductor.

9. The optical de-MUX of claim 7, wherein the substrate, the buried-oxide layer and the semiconductor layer comprise a silicon-on-insulator technology.

10. The optical de-MUX of claim 1, further comprising a polarization compensator proximate to the optical device, wherein the polarization compensator is configured to compensate for variation in a polarization of the optical signal.

11. A system, comprising an optical de-MUX, wherein the optical de-MUX includes:
an optical device configured to image and diffract an optical signal using a reflective geometry, wherein an FSR of the optical device associated with a given diffraction order abuts a plurality of FSRs associated with adjacent diffraction orders;
wherein the optical signal is associated with a predefined channel spacing; and
wherein a first channel spacing within the given diffraction order and a second channel spacing between one of the adjacent diffraction orders and the given diffraction order are equal to the predefined channel spacing so that the optical device has a comb-filter output spectrum, thereby reducing a tuning energy of the optical device by eliminating spectral gaps between diffraction orders of the optical device.

12. The system of claim 11, wherein an incidence angle associated with the given diffraction order is different than a diffraction angle associated with the given diffraction order.

13. The system of claim 11, wherein the optical device includes a diffraction grating on a curved surface.

14. The system of claim 13, wherein a grating pitch of the diffraction grating is greater than 20 μm.

15. The system of claim 11, wherein the optical device includes an echelle grating.

16. The system of claim 11, further comprising control logic configured to assign a given carrier wavelength in the optical signal to a nearest wavelength channel in one of the diffraction orders of the optical device, thereby compensating for a shift in the spectral locations of the channels and reducing the tuning energy.

17. The system of claim 11, further comprising:
a substrate;
a buried-oxide layer disposed on the substrate; and
a semiconductor layer having a thickness less than 1 μm disposed on the buried-oxide layer, wherein the optical device is included in the semiconductor layer.

18. The system of claim 17, wherein the substrate includes a semiconductor.

19. The system of claim 17, wherein the substrate, the buried-oxide layer and the semiconductor layer comprise a silicon-on-insulator technology.

20. A method for de-multiplexing an optical signal, wherein the method comprises:
- receiving the optical signal using an optical de-MUX, wherein the optical signal is associated with a predefined channel spacing;
- imaging and diffracting the optical signal using an optical device in the optical de-MUX, which has a reflective geometry, wherein an FSR associated with a given diffraction order of the optical device abuts a plurality of FSRs associated with adjacent diffraction orders;
- wherein a first channel spacing within the given diffraction order and a second channel spacing between one of the adjacent diffraction orders and the given diffraction order are equal to the predefined channel spacing so that the optical device has a comb-filter output spectrum, thereby reducing a tuning energy of the optical device by eliminating spectral gaps between diffraction orders of the optical device; and
- outputting the imaged and diffracted optical signal using the optical de-MUX.

* * * * *

UNITED STATES PATENT AND TRADEMARK OFFICE
CERTIFICATE OF CORRECTION

PATENT NO. : 8,873,961 B2
APPLICATION NO. : 13/205879
DATED : October 28, 2014
INVENTOR(S) : Luo et al.

It is certified that error appears in the above-identified patent and that said Letters Patent is hereby corrected as shown below:

In the Drawings

On sheet 6 of 6, in figure 7, under Reference Numeral 712, line 4, delete "ADJACEN" and insert -- ADJACENT --, therefor.

In the Specification

In column 5, line 8, delete "X" and insert -- $\lambda$ --, therefor.

In column 5, line 64, delete "$FSR = \lambda \cdot \eta_{eff}[(m+1) \cdot \eta_g - _{eff}]^{-1}$," and insert -- $FSR = \lambda \cdot \eta_{eff} \cdot [(m+1) \cdot \eta_g - \eta_{eff}]^{-1}$, --, therefor.

Signed and Sealed this
Twenty-third Day of June, 2015

Michelle K. Lee
*Director of the United States Patent and Trademark Office*